United States Patent
Cutting et al.

(10) Patent No.: US 11,207,553 B2
(45) Date of Patent: Dec. 28, 2021

(54) WATER MIST PROTECTION FOR FORCED VENTILATION INTERSTITIAL SPACES

(71) Applicant: Tyco Fire Products LP, Lansdale, PA (US)

(72) Inventors: Sean E. Cutting, West Warwick, RI (US); Alex Palau Bosch, Barcelona (ES)

(73) Assignees: TYCO FIRE PRODUCTS LP, Lansdale, PA (US); LPG TECNICAS EN EXTINCION DE INCENDIOS, S.L., Barcelona (ES)

( * ) Notice: Subject to any disclaimer, the term of this patent is extended or adjusted under 35 U.S.C. 154(b) by 60 days.

(21) Appl. No.: 16/538,346

(22) Filed: Aug. 12, 2019

(65) Prior Publication Data

US 2019/0358476 A1   Nov. 28, 2019

Related U.S. Application Data

(62) Division of application No. 15/550,714, filed as application No. PCT/US2016/018120 on Feb. 16, 2016, now Pat. No. 10,413,764.

(Continued)

(51) Int. Cl.
*A62C 3/00* (2006.01)
*A62C 3/16* (2006.01)
(Continued)

(52) U.S. Cl.
CPC .............. *A62C 3/16* (2013.01); *A62C 3/00* (2013.01); *A62C 35/58* (2013.01); *A62C 99/0072* (2013.01); *H02G 3/0412* (2013.01)

(58) Field of Classification Search
CPC .. A62C 3/16; A62C 3/00; A62C 35/58; A62C 99/0072; H02G 3/0412
(Continued)

(56) References Cited

U.S. PATENT DOCUMENTS 2,187,906 A * 1/1940 Lowe .................. A62C 35/605
169/17
3,905,424 A * 9/1975 Elwood .................. F16L 53/00
169/46
(Continued)

FOREIGN PATENT DOCUMENTS

CA    2841555      1/2013
CN    1480231 A    3/2004
(Continued)

OTHER PUBLICATIONS

Carpenter et al., "Planned Updates to FM Approval Standar Class 5560, Water Mist Systems, for 2015 Revision", IWMA Conference, Oct. 2014, Istanbul, Turkey, http://iwma.net/fileadmin/user_upload/IWMC_2014/FM_Carpenter_Jon_IWMC_2014.pdf, 30 pages.
(Continued)

*Primary Examiner* — Chee-Chong Lee
(74) *Attorney, Agent, or Firm* — Foley & Lardner LLP

(57) ABSTRACT

Water mist fire protection systems and methods for the protection of data centers having a raised floor defining an interstitial space beneath the floor. The systems and methods include the location of a plurality of automatic water mist nozzles above and/or beneath the floor to generate a water mist for effectively addressing a fire in the presence of a flow of forced air ventilation through the interstitial space. The systems and methods of water mist fire protection include the interconnection of the automatic water mist nozzles to a water supply to provide for dry pipe or preaction systems and methods. Water mist fire protection of data centers using fire propagating cable is also provided.

19 Claims, 10 Drawing Sheets

Related U.S. Application Data

(60) Provisional application No. 62/116,400, filed on Feb. 14, 2015.

(51) Int. Cl.
*A62C 35/58* (2006.01)
*A62C 99/00* (2010.01)
*H02G 3/04* (2006.01)

(58) Field of Classification Search
USPC .......................................................... 169/46
See application file for complete search history.

(56) References Cited

U.S. PATENT DOCUMENTS

| | | | |
|---|---|---|---|
| 4,428,434 A | 1/1984 | Gelaude | |
| 4,991,655 A * | 2/1991 | McHugh | A62C 35/68 137/218 |
| 5,125,458 A | 6/1992 | Berman | |
| 5,165,482 A | 11/1992 | Smagac et al. | |
| 5,538,396 A | 7/1996 | Meierhoefer | |
| 5,611,218 A * | 3/1997 | Naumovitz | F25J 3/0426 62/646 |
| 5,692,571 A | 12/1997 | Jackson | |
| 5,732,511 A | 3/1998 | Scott | |
| 5,797,457 A | 8/1998 | Sundholm | |
| 5,803,180 A * | 9/1998 | Talley | A62C 35/68 169/16 |
| 5,839,667 A | 11/1998 | Fishcer | |
| 7,168,212 B2 * | 1/2007 | Jette | E04F 15/02458 211/181.1 |
| 2013/0025888 A1 | 1/2013 | Eckholm et al. | |
| 2016/0175633 A1 | 6/2016 | Smith et al. | |

FOREIGN PATENT DOCUMENTS

| | | |
|---|---|---|
| CN | 101553285 | 10/2009 |
| DE | 10 2004 002 648 | 8/2005 |
| GB | 1 295 711 | 11/1972 |
| JP | S54-153063 | 12/1979 |
| JP | 40-8066488 | 3/1996 |
| WO | WO-98/09684 | 3/1998 |

OTHER PUBLICATIONS

International Search Report and Written Opinion for International Application No. PCT/US2016/018120, dated Jul. 27, 2016, 19 pages.

* cited by examiner

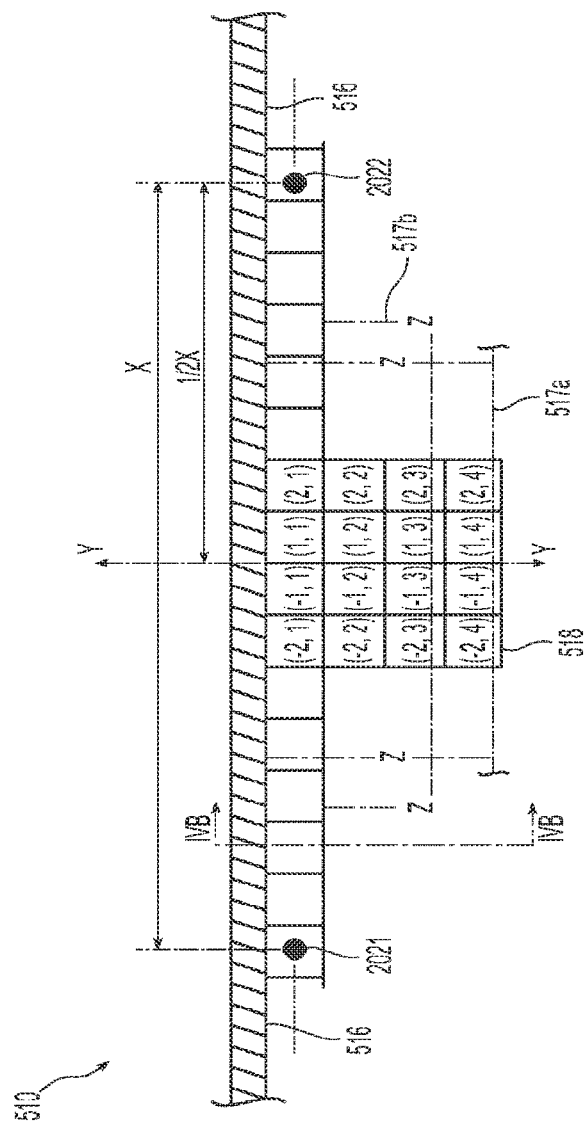
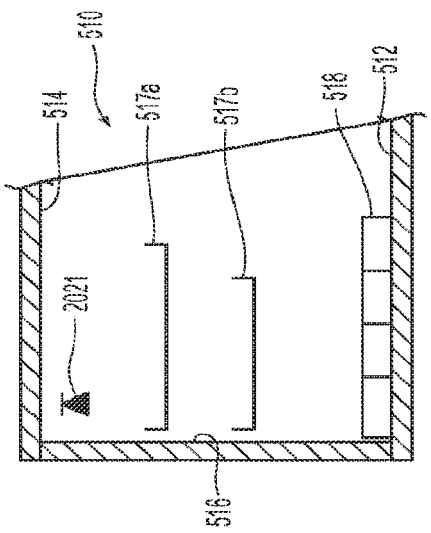

WATER MIST PROTECTION FOR FORCED VENTILATION INTERSTITIAL SPACES

PRIORITY DATA & INCORPORATION BY REFERENCE

The present disclosure is a divisional of U.S. application Ser. No. 15/550,714, titled "Water Mist Protection for Forced Ventilation Interstitial Spaces," filed Aug. 11, 2017, which is a National Stage Application of International Patent Application No. PCT/US2016/018120, titled "Water Mist Protection for Forced Ventilation Interstitial Spaces," filed Feb. 16, 2016, which claims the benefit of priority to U.S. Provisional Application No. 62/116,400, "Water Mist Protection for Forced Ventilation Interstitial Spaces," filed on Feb. 14, 2015, which is incorporated herein by reference in its entirety.

TECHNICAL FIELD

This invention relates to fire protection systems and devices, and more particularly fire protection systems using automatic water mist nozzles for the protection of occupancies having interstitial spaces such as, for example, data centers.

BACKGROUND

Generally, a data center consists of an equipment room, utilities, and support infrastructure including for example, air cooling or handling equipment and associated electrical and data cable. Industry accepted recommendations for the protection of data centers are provided in FM Global publication "Property Loss Prevention Data Sheet 5-32: Data Centers and Related Facilities" (July 2012). The loss prevention recommendations include protection recommendations for data centers using water mist systems. More specifically, Data Sheet 5-32 provides data center protection recommendations using an automatic water mist system FM Approved for protection of light hazard occupancies. According to the FM recommendations, use of the water mist systems is subject to certain restrictions or limitations including: (i) the water mist system must be a wet system, i.e., a system in which the automatic nozzles are attached to a piping system containing water and connected to a supply so that water discharges immediately from nozzle operated by the heat from a fire; (ii) the data center to be protected must use non-fire-propagating cables in its cable trays; and (iii) the ventilation or air handling systems of the data center are to be interlocked with the water mist system to shut down upon actuation of the water mist fire protection system.

For data center operations it is desirable to run its ventilation systems independent of or without the restrictions of fire protection. Data center equipment rooms can be very large having square footage equal to one or more football fields. For such data centers, shutting down the ventilation system upon fire protection system operation can be an impediment to the data center operations particularly where any indication of a fire is limited to a small area. Accordingly, it would be desirable to have water mist fire protection systems for data centers in which the ventilation or cooling systems can provide for continuous cooling during fire protection operation. Additionally, it would be desirable to have water mist fire protection for propagating and non-propagating cable to provide additional flexibility in the data center construction and operation. Moreover, it would be desirable to have water mist fire protection for a data center that can be configured as a dry pipe or preaction system to keep water out of the system piping in an unactuated state of the water mist system.

Criteria for FM Approval of water mist systems is provided in FM Approvals LLC publication "Approval Standard for Water Mist Systems: Class Number 5560" (November 2012). In October 2014, FM Approvals made a conference paper presentation at the International Water Mist Association (IWMA) Conference in Istanbul, Turkey entitled "Planned Updates to FM Approval Standard Class 5560, Water Mist Systems, for 2015 Revision." In the presentation, it was noted that the Class 5560 Approval Standard does not evaluate the aforementioned Data Sheet 5-32 restrictions. Accordingly, FM Approval set forth in its presentation the objectives for evaluating water mist systems in data center protection: i) to evaluate specific fire load, e.g., cables for data processing equipment room; (ii) to evaluate forced ventilation; and (iii) to evaluate water delivery time delay including interlocked systems. The IWMA presentation outlined fire test protocols and criteria for the protection of data centers for above and below a raised floor without the recommendation restrictions. A copy of the FM Approval conference paper is available at <http://iwma.net/fileadmin/user_upload/IWMC_2014/FM_Carpenter_Jon_IWMC_2014.pdf.

Accordingly in 2014, work was ongoing to enable fire testing of water Mist systems. for data centers without the FM recommendation restrictions. However, the 2014 conference paper does not identify specific nozzles for use in the proposed fire testing, it does not identify specific nozzle spacing or operational parameters, nor does the paper outline the manner in which nozzles can be identified for use the proposed fire test or in an actual data center environment without the system restrictions. At that time, there remained a need for a system solution which identified nozzles and their installation parameters to overcome the system restrictions of Data Sheet 5-32.

SUMMARY OF THE INVENTION

Preferred embodiments of water mist fire protection system and methods are provided which overcome industry accepted restrictions on water mist systems in the protection of data centers. Therefore, preferred embodiments of a water mist system for fire protection of data centers can: (i) generate a water mist to effectively address a fire in the presence of a forced ventilation; (ii) provide protection using fire propagating cable; and/or (iii) provide effective water mist fire protection following a water delivery delay time. Thus in a preferred aspect, embodiments of a water mist fire protection system and its operation provide fire protection for a data center with or during continuous or simultaneous operation of the ventilation system of the data center. The preferred systems and methods include locating and interconnecting automatic water mist nozzles either above or beneath a raised floor with operation of the ventilation system is maintained on during the water mist generation. Moreover, the preferred water mist fire protection systems and methods provides for fire protection of propagating and non-propagating cable. Preferred embodiments of the system can be configured for operation as either a dry pipe or preaction system in which interconnecting pipes of the system are maintained dry in an unactuated state of the system. Alternatively, embodiments of the system can be configured as a wet pipe system with protection for propagating cables and/or in the presence of forced ventilation.

A preferred method is also provided for identifying water mist nozzles for use in a system that overcomes the FM recommendation restrictions and that can satisfy recently developed fire test protocols by FM Approval. The preferred method employs a water mist distribution test and defines preferred criteria for water mist weight rate distribution. The preferred method identifies water mist nozzles generating a preferred water distribution rate in a preferred test set-up that includes a test deck and a test floor spaced from the test deck at a clearance distance of three feet (3 ft.) (0.9 m). A first test cable tray is mounted between the test deck and floor, a second test cable tray mounted between the test deck and floor with two nozzles located over the first cable tray and beneath the test floor to define a diffuser-to-floor clearance distance. Each of the two nozzles is spaced from a wall extending between the test floor and deck. A plurality of collection pans are located on the test deck and centered between the two nozzles. The plurality of collection pans including au array of eight pans of four rows and two columns centered about and within one foot of a midline between the two nozzles. The water distribution rate decreases from the first row to the fourth row with the decrease from first row to the second row is no more than 60% and the decrease from the second row to either the third row or the fourth row ranges from 5-40%.

In addition to the identification of preferred nozzles for use in the systems and methods of water mist fire protection, the preferred systems and methods include preferred nozzle orientations, spacing and relative locations with respect to the raised floor, cable tray and/or grate of the data center. Accordingly, preferred embodiment of the systems and methods provide an above-the-floor configuration, a below-the-floor configuration; and/or a local application configuration to provide localized water mist fire protection to the one or more cable trays. The preferred systems and methods include nozzles located above and below the raised floor in an upright orientation and alternatively in a pendent orientation with a preferred nozzle to nozzle spacing and/or hydraulic design. Another preferred method of water mist fire protection for data centers includes obtaining a plurality of automatic mist nozzles; and distributing the plurality of nozzles for installation at least one of above or below the raised floor to address a fire with a mist in the presence of the continuous flow of air; protect fire propagating cable or provide for one of dry pipe or preaction fire protection.

DESCRIPTION OF DRAWINGS

The accompanying drawings, which are incorporated herein and constitute part of this specification, illustrate exemplary embodiments of the invention and, together with the general description given above and the detailed description given below, serve to explain the features of the exemplary embodiments of the invention.

FIGS. 4A-4B is a preferred test set-up for distribution testing of water mist nozzles.

Like reference symbols in the various drawings indicate like elements.

DETAILED DESCRIPTION

Figure 1A:
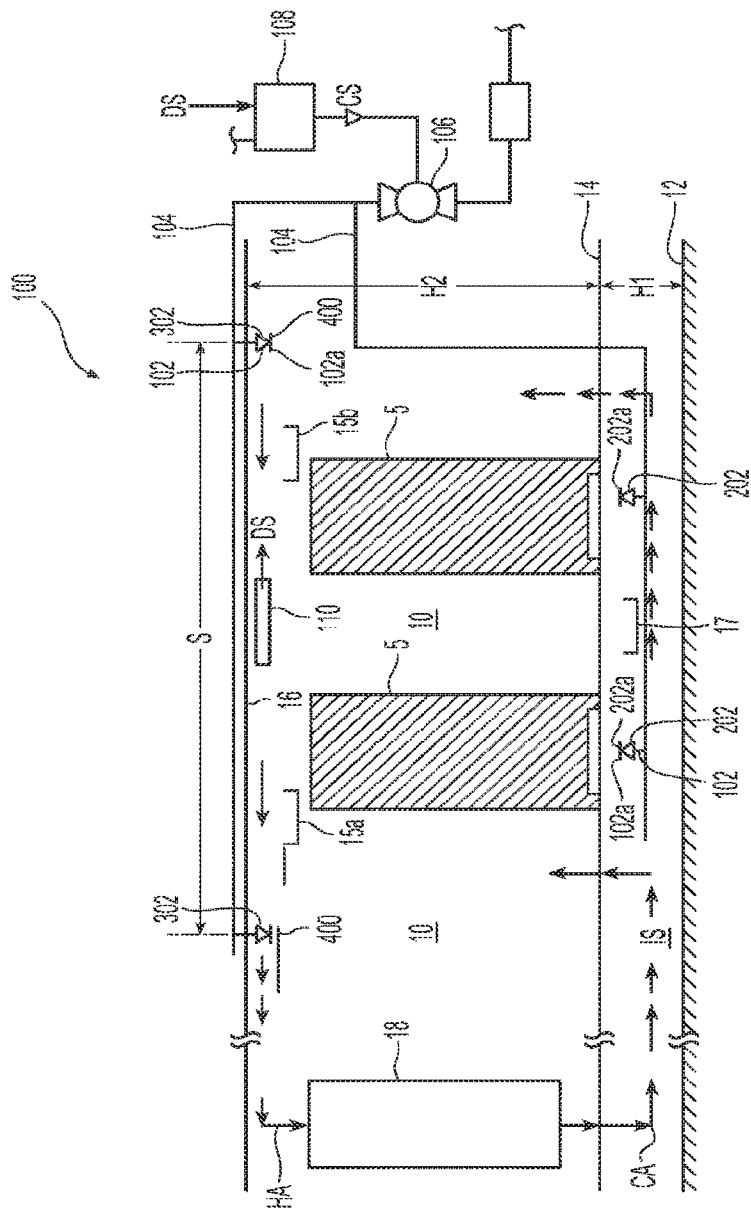
FIG. 1A is an schematic illustration of a preferred embodiment of a Water mist fire protection system in an exemplary data center.
Figure 1C:
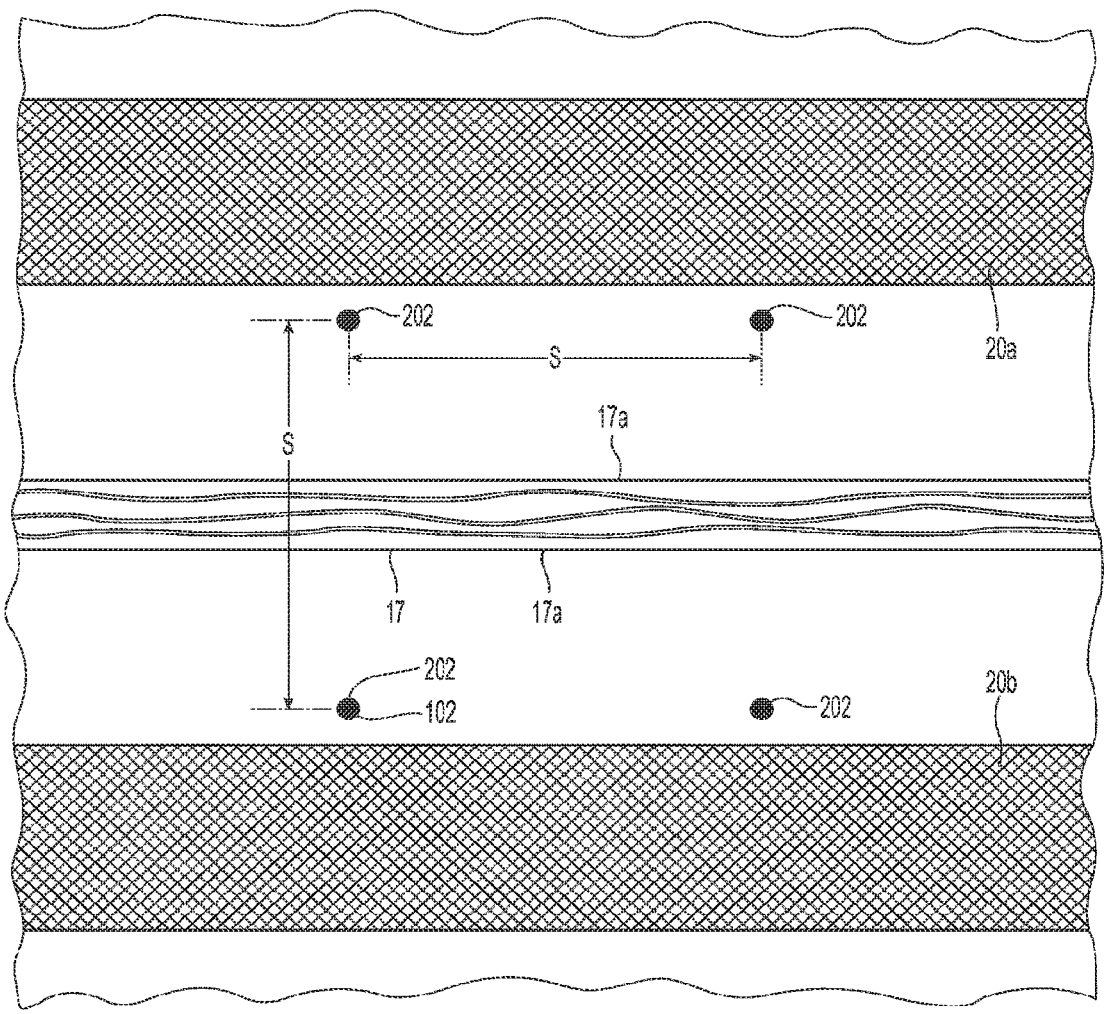
FIGS. 1B and 1C are elevation and plan views of the interstitial space and system of FIG. 1A.
Figure 1B:
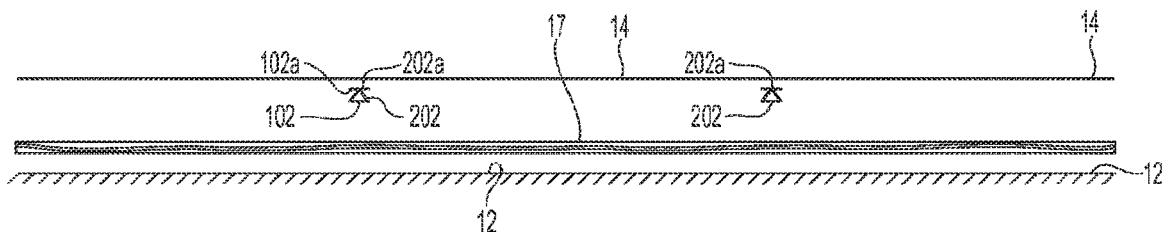

Shown in FIGS. 1A-1C are various views of a preferred embodiment of a water mist fire protection system 100 for protection of a data center 10. The exemplary data center 10 can be defined by a deck 12, a raised floor 14 disposed above the deck 12 defining an interstitial space IS in between. For the preferred fire protections systems 100 described herein, the raised floor 14 is preferably disposed above the deck 12 at a distance or height H1 of no more than a maximum distance of 3.28 ft. (1,0 m) above the deck 12. The data center 10 includes a ceiling and more preferably a suspended ceiling 16 disposed above the raised floor 14. For preferred embodiments of fire protection systems 100 described herein, the ceiling 16. is preferably located at a distance or height H2 of no more than a maximum distance of 16.4 ft. (5,0 m) above the raised floor 14.

The representative data center 10 is configured for housing or storing one or more server cabinets 5 along with associated supporting equipment such as for example, cables, cable trays and cooling equipment. For example, one or more above-the-floor elongate cable, trays 15 (15a, 15b) can be disposed beneath the ceiling 16 with the tops of the trays at a distance or clearance of no less than a preferred minimum 5.74 ft. (1,75 m) below the ceiling; and one or more below-the-floor elongate cable trays 17 can be disposed in the interstitial space IS between the floor 14 and the deck 12 with the below-the-floor cable tray(s) located beneath the floor at preferred distance or clearance of no less than of 12 in. (30,6 cm) from the floor 14. The cable trays 15, 17 may be alternatively respectively located closer to the ceiling and floor provided the fire protection system 100 can effectively address a fire in a manner as described herein. The cable trays 15, 17 can carry fire-propagating and non-fire propagating cable for use in the data center 10. Unlike fire protection systems for data centers constructed under existing industry accepted standards or recommendations, the preferred embodiments of the fire protection system 100 can provide for effective fire protection of either type of cable.

The data center 10 can also include a ventilation system 18 along with associated equipment for providing cool air CA in the interstitial space S between the floor 14 and deck 12 and throughout the data center 10 for cooling the equipment stored therein. Cool air CA can be delivered into the storage space of the data center 10 by upward flow through one or more openings in the raised floor 14, for example, through one or more floor grates 20 or grated regions installed throughout and/or about the raised floor 14. Heated air HA coming off of the aisles between the cabinets 5 can be returned or pulled back to the ventilation system 18.

A preferred embodiment of the system 100 includes a plurality of automatic water mist nozzles 102 for receipt of water delivered at a desired working pressure in which each nozzle preferably has a diffuser 102a for generating and dispersing a water mist to effectively address a fire. A network of pipes 104 interconnect the plurality of nozzles 102 to one another and an appropriate water source or supply FL to provide each nozzle with the water at its working pressure. The piping can be constructed from any material suitable for water mist systems including for example, stainless steel piping, CPVC piping and/or internally galvanized piping. The water supply or source FL can be for example, a connection off of municipal water supply system, and more preferably is capable of supplying 60 minutes of water to the most remote, more particularly most hydraulically remote eighteen nozzles 102 in the system 100.

As a water mist fire protection system, the system 100 protects the data center and equipment stored therein by addressing a fire and more preferably controlling Class A fires. The system 100 can effectively address a fire by one or more of the following: (i) extracting heat from the fire as the water is converted into vapor and the fuel of the fire is cooled; (ii) reducing oxygen levels by water vapor displacement of oxygen near the fire; directly impinging wetting and cooling of the combustibles within the data center 10; and/or (iv) enveloping the protected area to pre-wet adjacent combustibles, cool gases and other fuels in the area as well as block the transfer of radiant heat to adjacent combustibles.

Moreover, operation of the preferred embodiments of the system 100 described herein preferably provide effective water mist fire protection to address a fire with or during continuous or simultaneous operation of the ventilation system 18. Thus, the preferred water mist fire protection system 100 does not require that the ventilation system 18 be interlocked such that the ventilation system shuts off during operation of the fire protection system 100. Unlike prior known systems constructed under existing industry standards or recommendations, cooling air CA can remain circulating during operation of the fire protection system 100. In a preferred method of addressing a fire in the data center, the preferred fire protection system 100 addresses the fire in the data center 10 by generating a water mist from a plurality of interconnected water mist nozzles 102 disposed either above or beneath the raised floor 14 in response to the fire while operation of the ventilation system 18 is maintained during the water mist generation. More particularly, the system 100 and its method of addressing a fire preferably provides for effective fire protection with a water mist in the presence of the forced and more preferably continuous air flow CA, HA from the Ventilation system.

By using automatic or sealed, thermally responsive nozzles 102, preferred embodiments of the system 100 can be configured for operation as a wet pipe system, in which the piping 104 interconnecting the nozzles is filled with water up to the internal seal of the nozzle 102 in an unactuated state of the system 100. Upon thermal actuation of one or more nozzles 102, water is immediately discharged for impact against the nozzle diffuser 102a to generate the water mist. However unlike previously known fire protection systems for data centers constructed under the industry standards and recommendations, alternative embodiments of the system 100 can be configured as either a dry pipe or preaction system in which the interconnecting pipes 104 are maintained dry in an unactuated state of the system. Thus, the system 100 can include a fluid control valve 106 to control the flow and delivery of water to the nozzles 102 upon thermal actuation of one or more nozzles 102. In an alternate preferred operation of the system 100 as a preaction system, a fire detection, signal is generated in response to a fire and the fluid control valve 106 is operated in response to the detection signal to fill the network of interconnecting pipes 104 with water before thermal actuation of one or more automatic water mist nozzles 102. Upon thermal actuation of one or more nozzles 102, water is discharged for impact against the diffuser 102a of the actuated nozzles and a water mist is generated to address the fire.

Accordingly, preferred embodiments of the system 100 can further include the fluid control valve 106 for connecting the network of pipes 104 to the water supply FL and more particularly control the flow and pressure of fluid delivered to the nozzles. The fluid control valve 106 is preferably electrically operated and controlled by a controller 108. Thus the controller 108 is coupled to the fluid control valve 106 and generates an appropriate control signal to open the valve 106 to permit the flow of water from the supply FL out the fluid control valve 106, through the network of pipes 104 for delivery to the nozzles 102 of the system 100. The controller 108 preferably generates the control signal to operate the valve 106 in response to a detection signal indicating a fire. To detect a fire, the system 100 preferably includes one or more detectors 110 for detecting a fire within the data center 10 and generating a detection signal DS indicating a fire. The detector 110 can be any type of sensor capable of detecting the start or presence of a fire, such as for example a thermal, smoke or particulate sensor and generating an appropriate detection signal DS. The controller 108 is appropriately coupled to the controller 108 wired or wirelessly to receive the detection signal DS and generate the appropriate control signal CS for operation of the fluid control valve 106 in a preferably single interlock manner. As a dry pipe or preaction system, the preferred system 100 experiences a fluid delivery delay at full fluid pressurization from the water supply FL to the one or more actuated nozzles 102. The controller 108, its operation of the valve 106, and the network of pipes preferably define a fluid delivery delay time of no more than sixty seconds (60 sec.) and more preferably no more than thirty seconds (30 sec.). Exemplary embodiments of the fluid control valve, controller, the detector and a single interlock configuration are shown and described in greater detail in Tyco Fire Products LP technical data sheets TFP1420 entitled "Preaction System with DV-5 Deluge Valve Single Interlock, Supervised—Electric Actuation 1½ thru 8 inch (DN40 thru DN200)" (October 2014) and TFP2270, entitled "AQUAMIST Mist Control Center (MCC) Pump Skid Unit (October 2014). Each of TFP1420 and TFP2270 is incorporated by reference in its entirety.

The nozzles 102 are located and installed to provide or define one or more fire protection configurations of particularized regions of the data center including: an above-the-floor configuration, a below-the-floor configuration; and/or a local application configuration to provide localized water mist fire protection to the one or more cable trays 17 disposed beneath the floor 14. Moreover, preferred nozzles have been identified for use in the preferred system 100 that effectively provide for water mist fire protection for data centers without the installation and construction requirements and limitations under the industry accepted recommendations and standards previously described such as, for example, (i) wet only system type fire protection; (ii) ventilations system interlocking; and (iii) the use of non-propagating cables in the cable trays. Accordingly, preferred methods and systems 100 of water mist fire protection of a data center provide for locating a plurality of automatic water mist nozzles 102 at least one of above or below the raised floor 14 and interconnecting the automatic water mist nozzles to a water supply for generating the water mist to address a fire in the presence of a continuous flow of air from the ventilation system 18 for the protection of the data center including non-propagating and propagating cable. Additionally, the preferred systems and methods provide for a water mist fire protection system that can be either a dry pipe system or a preaction system.

Figure 1D:
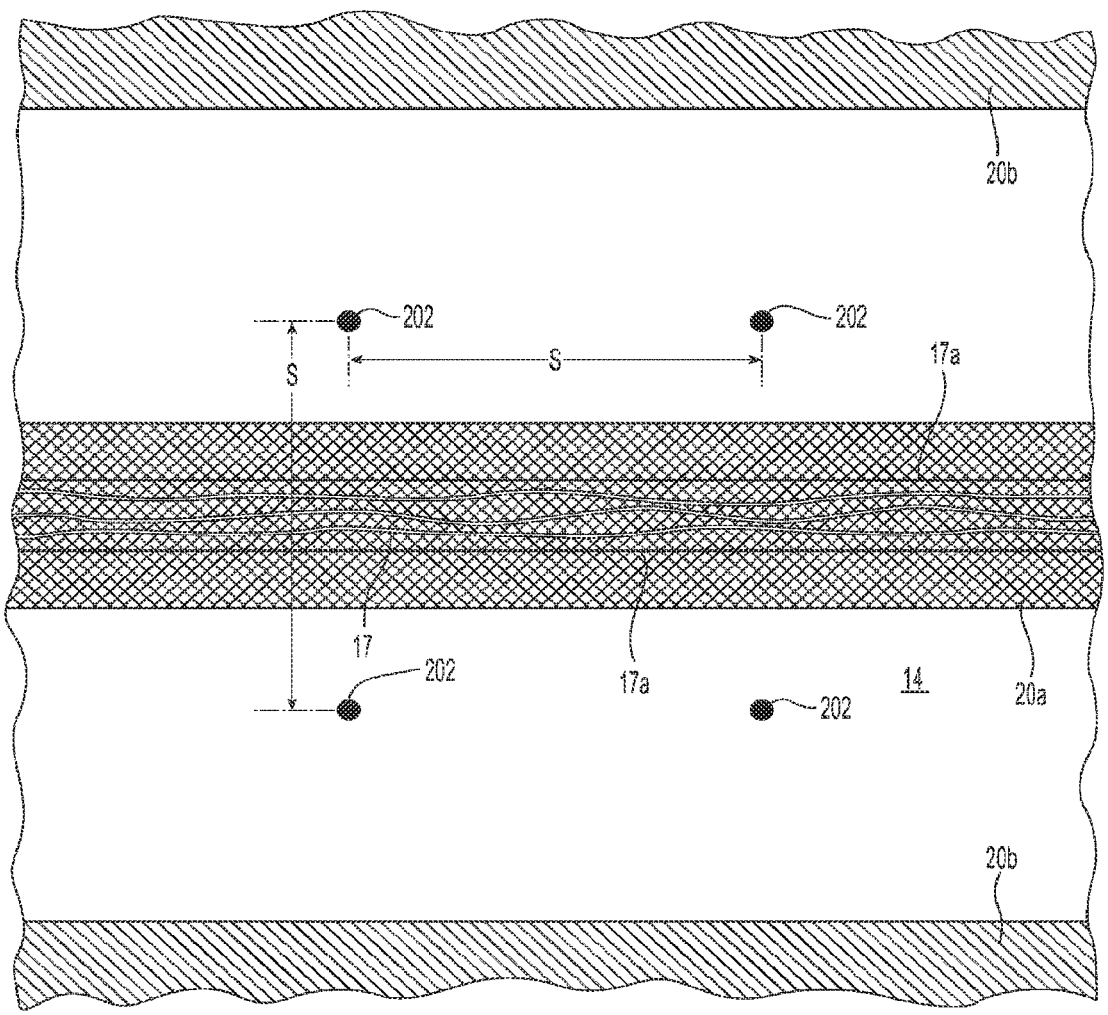
FIG. 1D is a plan view of the system of FIG. 1A for an alternate arrangement of the interstitial space of the data center.

Referring to FIGS. 1B, 1C, 1D, schematically shown are a plurality of preferred nozzles 202, each having a diffuser 202a, located below the raised floor 14 to define preferred below-the-floor configuration and localized application configuration in the interstitial space S for the protection of the data center 10. The plurality of located nozzles 202 are shown located to protect propagating cable or non-propagating cable in at least one below-the-floor cable tray 17. In one preferred embodiment of the below-the-floor configuration, for example as seen in FIGS. 1B and 1C, the preferred nozzles 202 are located and installed below the raised floor in an upright configuration. Once installed, the upright nozzles 202 and their diffusers 202a preferably define a minimum diffuser-to-floor distance or clearance between the floor and the diffuser preferably of no more than a maximum of 3 in. (7,6 cm.). Where a preferred upright nozzle 202 is located beneath a floor grate region 20, the nozzle is inset preferably no further than a maximum 2 in. (51 mm.) from a lateral or elongate edge of the floor grate 20. The nozzles 202 define a preferred a nozzle-to-nozzle spacing SxS ranging from a minimum 6 ft.x6ft. (1,8 inx1,8 in) to a maximum 12 ft.x12 ft. (3,7 mx3,7 m), and no more than 12 ft. (3,7 m.) from an elongated edge 17a of any cable tray 17 beneath the floor regardless of whether the cable tray is spaced from one or more floor grates 20a, 20b, as seen in FIGS. 1B and 1C; or beneath a floor grate 20 as seen, for example, in FIG. 1D. The preferred nozzles 202 define a preferred nozzle pressure of 110 to 250 psi. (7,6 to 17,2 bar). Hydraulically, the preferred below-the-floor nozzles 202 can be hydraulically designed to the most hydraulically demanding area in the system 100 or alternatively hydraulically designed to an area-of-coverage design defined by a preferred minimum six nozzles.

Figure 1E:
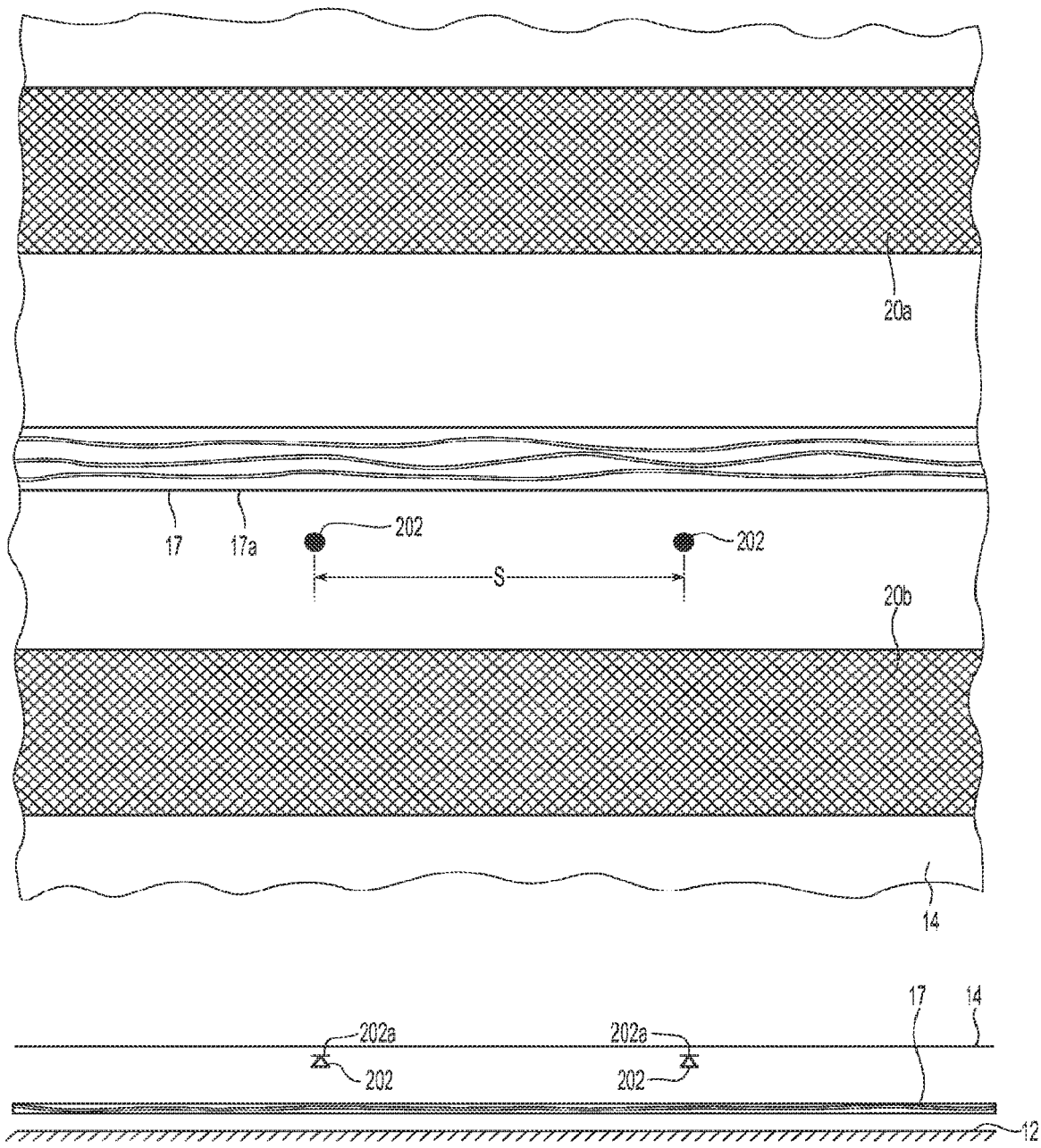
FIG. 1E are plan and elevation views of another embodiment of the system of FIG. 1A.

Additionally or alternatively, the one or more of preferably upright nozzles 202. located below the floor 14 can provide for localized application of water mist in the protection of the below-the-floor cable tray 17 and the cable housed therein as seen schematically, for example, in FIG. 1E. In particular, the group of water mist nozzles are installed in an upright configuration with a nozzle-to-nozzle spacing SxS ranging from a minimum 6 ft.x6 ft. (1,8 inx1,8 m) to 12 ft.x12 ft. (3,7 mx3,7 m) with each of the nozzles 202 including a diffuser 202a at a diffuser-to-floor distance being no more than a maximum of 3 in. (7.6 cm.). In the preferred localized application, the preferred nozzles 202 are preferably spaced no more than 12 in. (30.5 cm.) from an elongated edge 17a of the cable tray, and are preferably not located over top of the cable tray 17. The preferred localized application configuration is preferably hydraulically configured to a minimum four nozzles per design area. The preferred localized application configuration can provide for effective water mist fire protection of the cable tray 17 without having to install a complete grid for just the cable tray 17.

Figure 2A:
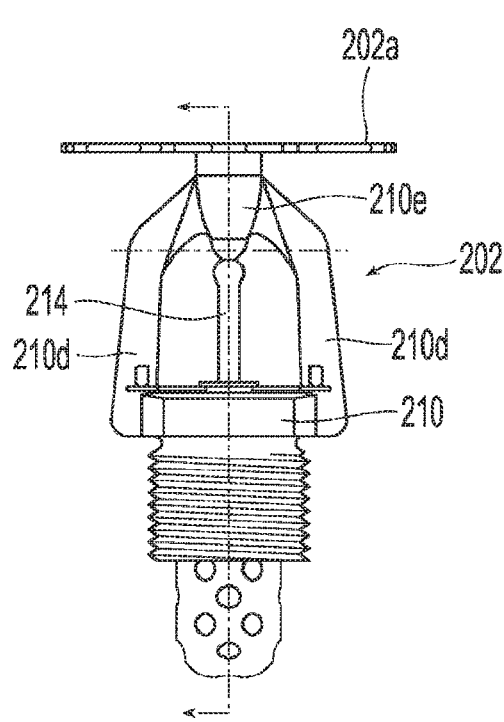
FIGS. 2A-2B are elevation and cross-sectional views of a preferred automatic nozzle for use in the system of FIG. 1A.
Figure 2B:
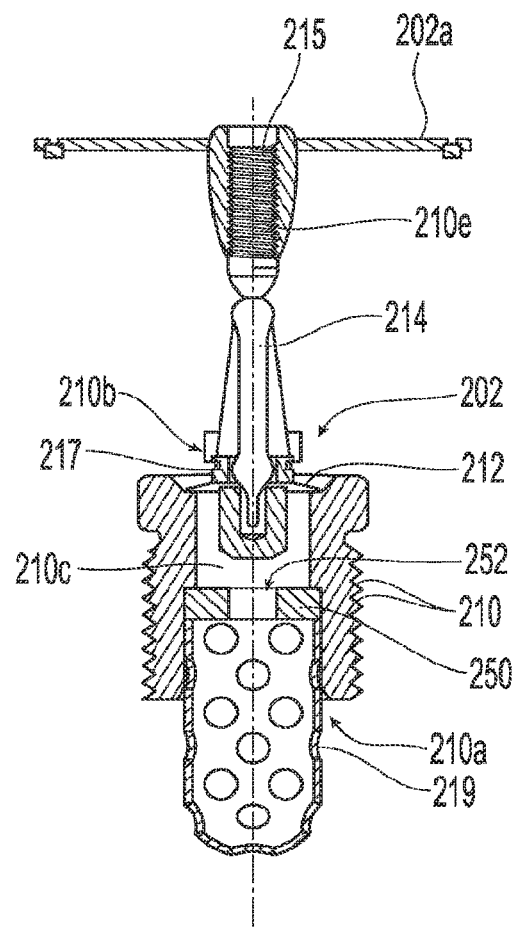

Shown in FIGS. 2A and 2B are elevation and cross-sectional views of a preferred automatic nozzle 202 for use in the below-the-floor and localized applications configurations of the preferred methods and systems described herein. The preferred nozzle 202 generally includes a frame body 210 for coupling to a branch line of the interconnecting piping network 104, an internal seal assembly 212, a thermally responsive trigger 214, and a preferred diffuser 202a for generating the water mist to address a fire. The frame body 210 includes an inlet 210a, an outlet 210b with a passageway 210c extending between the inlet 210a and the outlet 210b. The nozzle 202 define a discharge coefficient of a preferably nominal K-Factor. Preferably, the nozzle 202 defines a nominal K-factor of less than 1 gpm/psi$^{1/2}$ and is more preferably 0.59 gpm/psi$^{1/2}$.

Figure 2C:
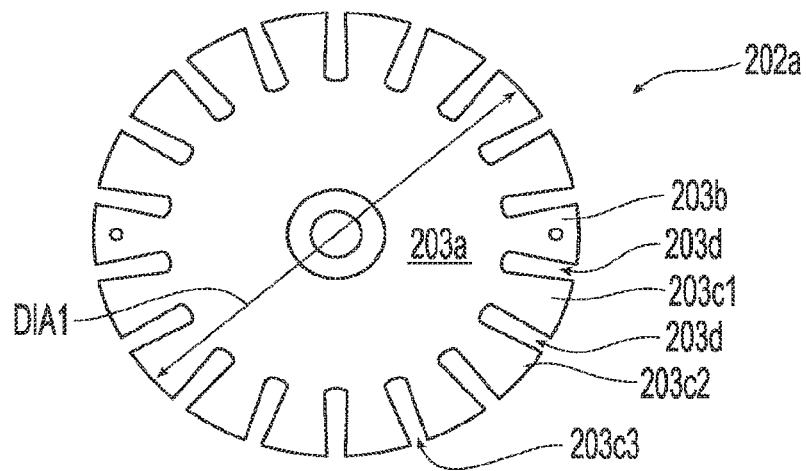
FIG. 2C is a preferred diffuser for use in the automatic nozzle of FIGS. 2A-2B.

The frame body 210 further preferably includes a pair of frame arms 210d diametrically opposed about the outlet 210b. The diffuser 202a is supported from and spaced from the outlet 210b by the frame arms 210d. Once coupled to a water supply pipe 104, the preferred diffuser 202a and frame body 210 defines a preferred upright orientation. The frame arms 210d preferably converge toward an apex or knuckle 210e axially aligned with the passageway and outlet 210c, 210b. The diffuser 202a is preferably engaged with and centered with the knuckle 210c. As seen in FIG. 2C, the preferred diffuser 202a is a preferably planar member with a central portion 203a axially aligned and centered with the passageway 210c and an outer peripheral portion 203b circumscribed about the central portion 203a to define a substantially circular periphery with a preferred diameter DIA1 of 1.7 inches (43,2 mm). The preferred peripheral portion 203b includes a plurality of spaced apart tines (203c1, 203c2, 203c3, . . . 203ci) to define a plurality of open ended slots 203d formed therebetween extending radially inward preferably at equal distance toward the central portion 203a.

In an unactuated state of the nozzle 202, the sealing assembly 212 is supported in the outlet 210b by the thermally responsive trigger 214 which is preferably embodied as thermally responsive glass bulb 214. The glass bulb 214 is supported against the sealing assembly 212 by the frame body 210 by a load or compression screw 215. In its thermal response to the fire, at a desired activation time, the bulb 214 ruptures thereby releasing its support from the sealing assembly which is preferably ejected from the outlet by an ejection spring 217. The thermally responsive element 214 can have a temperature rating ranging between about 125° F. to about 365° F., preferably 135° F., 155° F., 175° F., 200° F., 286° F., or 360° F., and more preferably is any one of 135° F. or 155° F. The bulb 214 is preferably configured with a Response Tithe Index (RTI) of 50 (meters-seconds)$^{1/2}$ or less and preferably any one of 24 or 32 (meters-seconds)$^{1/2}$ so as to have a fast response, and more preferably, the bulb 214 is such that the nozzle 202 can be a quick response device.

Disposed within the inlet 210a is a strainer 219 to filter out debris which may clog or damage the internal passageway of the nozzle 202. Preferably included within the passageway 210c is an orifice insert 250 preferably supported by a shelf or shoulder formed along the interior walls of the passageway 210c. The orifice insert 250 includes an interior through bore 252 through which incoming fluid flows. The orifice insert 250 and through bore 252 define the preferred K-factor of less than 1.00 gpm/(psi)$^{1/2}$, preferably in the range from about 0.5 to 0.70 gpm(psi)$^{1/2}$, and more preferably is 0.59 gpm/(psi)$^{1/2}$ (8.5 lpm/bar$^{1/2}$). Passageways defining larger or smaller K-factors can be employed provided the resulting water mist is effective in addressing a fire in the presence of an airflow and/or can be used in the protection of propagating cable. Upon thermal actuation of the nozzle 202, water passes through the orifice insert 250 and its through bore 252 for discharge from the outlet 210b in a preferably upward direction to impact the diffuser 202a for generation of the water mist to address the fire in a manner as described. A commercial embodiment of the preferred nozzle 202 is shown and described in Tyco Fire Products LP technical data sheet TFP2201, entitled "Ultra Low Flow AQUAMIST Nozzles Type ULF AM30 Automatic (Closed)" (May 2015).

Applicant has developed a preferred Method and criteria for the identification of the nozzles for preferred use in the system 100 and its embodiments described herein. Moreover, the preferred methods can be used for identifying nozzles to use in a fire test for water mist systems such as for example water mist test protocols and criteria outlined and developed by FM Approval in the planned update to Standard Class 5560. The preferred method of identifying nozzles includes a distribution analysis in a below-the-floor arrangement. Shown in FIG. 4A and FIG. 4B are schematic views of a test set-up 510 for evaluating the water mist patterns of nozzles for use in the system 100. The test set-up 510 includes a deck 512 and raised floor 514 spaced from the deck 512 by a clearance distance of three feet (3 ft.) Mounted between the deck and floor 512, 514 is a first cable tray 517a, and a second cable tray 517b. The top of the first cable tray 517a is located at a preferred distance of twelve inches from the raised floor 514 and the top of the second cable tray 517b is located at a preferred distance of twenty-four inches from the raised floor 514. Located over the first cable tray 517a and beneath the raised floor 514 at diffuser-to-floor-clearance distance of four inches (4 in.) are two preferred upright test nozzles 2021, 2022 such as previously described. Each nozzle is spaced inset from the wall 516 by a distance of six inches (6 in.). The two nozzles 2021, 2022 are spaced apart at a distance X of four meters (4,0 m) (13.1 ft.).

Located on the deck 512 are a group of water collection pans 518 that included pans disposed along the wall 516 and centered between the two preferred nozzles 2021, 2022. The tops of the pans measure about 1 ft.×1.ft. Two sets of discharge tests were conducted. In the first set of tests, water was delivered at a pressure of 110 psi. to the two nozzles 2021, 2022 having an orifice insert defining a K-factor of 0.59 gpm/(psi)$^{1/2}$ to provide for a flow of 6.2 gallons per minute (GPM). Water was discharged for a duration of 4 minutes. In the second set of tests, water was delivered at a pressure of 140 psi, to the two nozzles 2021, 2022 with the orifice insert defining a larger K-factor of 0.81 gpm/(psi)$^{1/2}$ to provide for a flow of 9.6 gallons per minute (GPM). Water was discharged again for a duration of four minutes (4 min.). Each of the collection pans 518 were appropriately weighed after the discharge period to determine the distribution weight rate in the pan. An array of eight collection pans 518 disposed about the midline (Y--Y) between the two nozzles 2021, 2022 were evaluated. Summarized in the tables below are the average measurements of the distribution weight rates in each of the eight collection pans in units of ounces per minute (oz./min.).

| K-Factor = 0.59 | | | K-Factor = 0.81 | | |
| --- | --- | --- | --- | --- | --- |
| Row | Column −1 | Column +1 | Row | Column −1 | Column +1 |
| 1 | 5.1 | 7.7 | 1 | 10.4 | 12.2 |
| 2 | 3.4 | 3.6 | 2 | 6.3 | 8.2 |
| 3 | 3.7 | 4.8 | 3 | 7.4 | 6.1 |
| 4 | 4.7 | 4.8 | 4 | 5.7 | 5.6 |

By looking at the variations between particular rows it was determined that the preferred nozzle 202 and its diffuser could provide for a water mist to effectively address a fire and protect a data center in a manner described herein. In particular, the variability in the subject array of eight collection pans from the wall 516 to four feet (4 ft.) inset was within acceptable ranges. It was noted that a decrease in weight rate from the first row to the second row was no more than 60% and is preferably less than about 50%. It was further noted that the change from the second row of collection pans to either the third or fourth pan was about 5-40% and is preferably in the range of 30-40%. Although the preferred distribution testing is conducted without forced ventilation or continuous air flow and without a fluid delivery delay, the resultant rates of weight distribution indicates the suitability of a nozzle to generate an effective mist for fire protection in the presence of forced ventilation or when subject to a fluid delivery delay. Accordingly, water mist distributions patterns have been identified which overcome the limitations under the current standards and recommendations. Moreover, a method of water mist fire protection is provided that includes obtaining preferred automatic mist nozzles; and distributing the nozzles for installation above or below the raised floor to address a fire with a mist in the presence of the continuous flow of air, protect fire propagating cable or provide for one of dry pipe or preaction fire protection. Obtaining a nozzle can include identifying a nozzle for use in a preferred water mist system using a preferred water distribution system. Alternatively, nozzles can be obtained by procurement or manufacture which can be identified for use in a water mist fire protection system as described. Distributing the nozzle can include selling, shipping or otherwise providing the obtained nozzles for installation in a preferred water mist fire protection system.

Figure 3A:
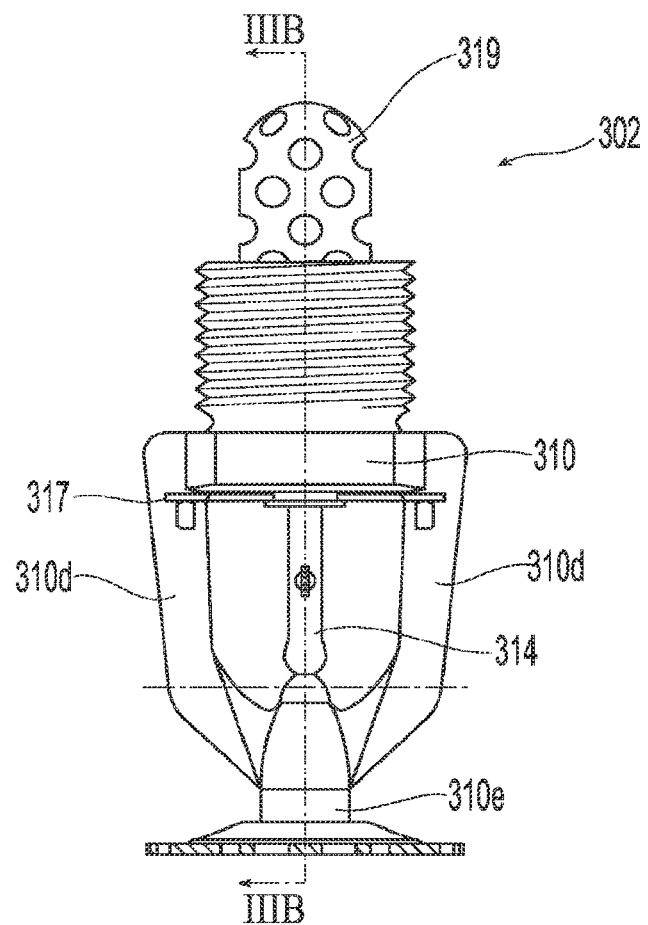
FIGS. 3A-3B are elevation and cross-sectional views of a preferred automatic nozzle for use in the system of FIG. 1A.
Figure 3B:
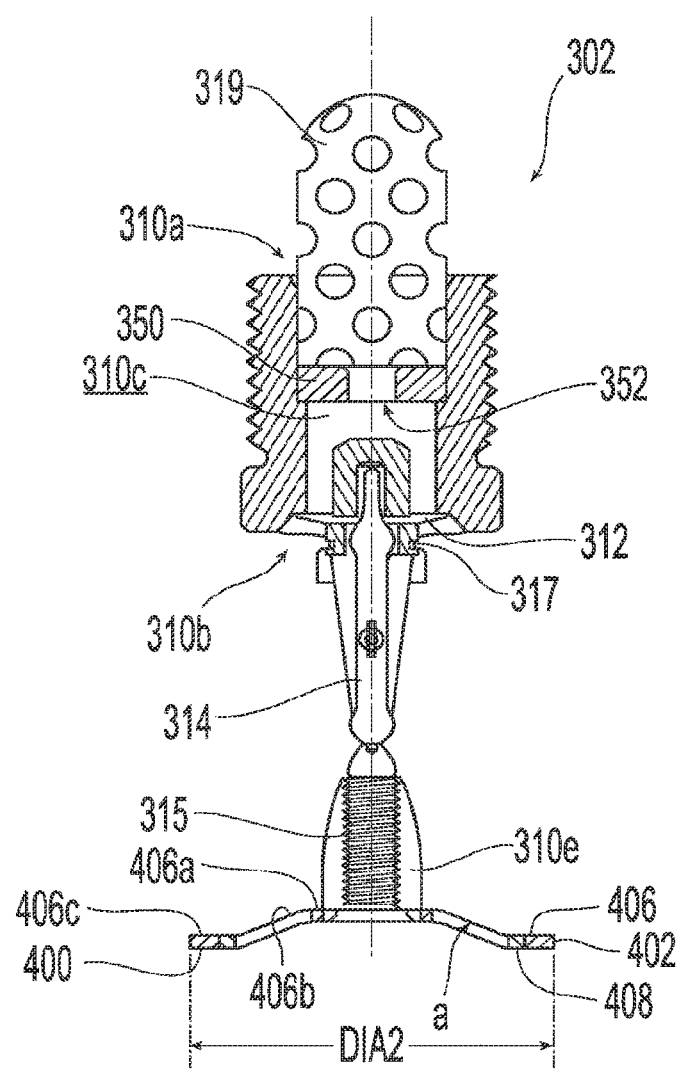

Shown in FIGS. 3A-3B are elevation and cross-sectional views of another preferred automatic nozzle 302 identified for use in the below-the-floor configurations of the preferred methods and systems described herein and more preferably for use in the local application for protection of below-the-floor cable trays 17. The preferred nozzle 302 generally includes a frame body 310 similar to that shown in FIGS. 2A and 2B. The frame 310 is configured for coupling to a branch line of the interconnecting piping network 104 in a preferably pendent configuration, an internal seal assembly 312, a thermally responsive trigger 314, and a preferred diffuser 400 for generating a water mist to address fire. The frame body 310 includes an inlet 310a, an outlet 310b with a passageway 310c extending between the inlet 310a and the outlet 310b. The outlet 310b and passageway 310c define a discharge coefficient of a preferably nominal K-factor. Preferably, the nozzle 302 defines a nominal K-factor of less than 1 gpm/psi$^{1/2}$ and is more preferably 0.59 gpm/psi$^{1/2}$.

The frame body 310 further preferably includes a pair of frame arms 310d diametrically opposed about the outlet 310b. The diffuser 400 is supported from and spaced from the outlet 310b by the frame arms 310d. Once coupled to a fluid supply pipe 104, the preferred diffuser 400 and frame body 310 defines a preferred pendent orientation. The frame arms 310d preferably converge toward an apex or knuckle 310e axially aligned with the passageway and outlet 310c, 310b. The diffuser 400 is preferably engaged with and centered with the knuckle 310e.

In an unactuated state, of the nozzle 302, the sealing assembly 312 is supported in the outlet 310b by the thermally responsive trigger 314 which is preferably embodied as a thermally responsive glass bulb 314. The glass bulb 314 is supported against the sealing assembly 312 by the frame body 310 by a load or compression screw 315. In its thermal response to the fire, at a desired activation time, the bulb 314 ruptures thereby releasing its support from the sealing assembly 312 which is preferably ejected from the outlet by an ejection spring 317. The thermally responsive element 314 can have a temperature rating ranging between about 100° F. to about 400° F., and more preferably is any one of 135° F., 155° F., 175° F., 200° F., 286° F., or 360° F. The bulb 314 is preferably configured with a Response Time Index (RTI) of 50 (meters-seconds)$^{1/2}$ or less and preferably any one of 24 or 32 (meters-seconds)$^{1/2}$ so as to have a fast response, and more preferably, the bulb 314 is such that the nozzle 302 can be a quick response device.

Disposed within the inlet 310a is a strainer 319 to filter out debris which may clog or damage the internal passageway of the nozzle 302. Preferably included within the passageway 310c is an orifice insert 350 preferably supported by a shelf or shoulder formed along the interior walls of the passageway 310c. The orifice insert 350 includes an interior through bore 352 through which incoming fluid flows. The orifice insert 350 and through bore 352 define the preferred K-factor of less than 1.00 gpm/(psi)$^{1/2}$, preferably in the range from about 0.5 to 0.70 gpm/(psi)$^{1/2}$, and more preferably is 0.5 gpm/(psi)$^{1/2}$ (8.5 lpm/bar$^{1/2}$). Upon thermal actuation of the nozzle 302, water passes -through the orifice insert 350 and its through bore 352 for discharge from the outlet 310b to impact the diffuser 400 for generation of the water mist to address the fire.

Figure 3C:
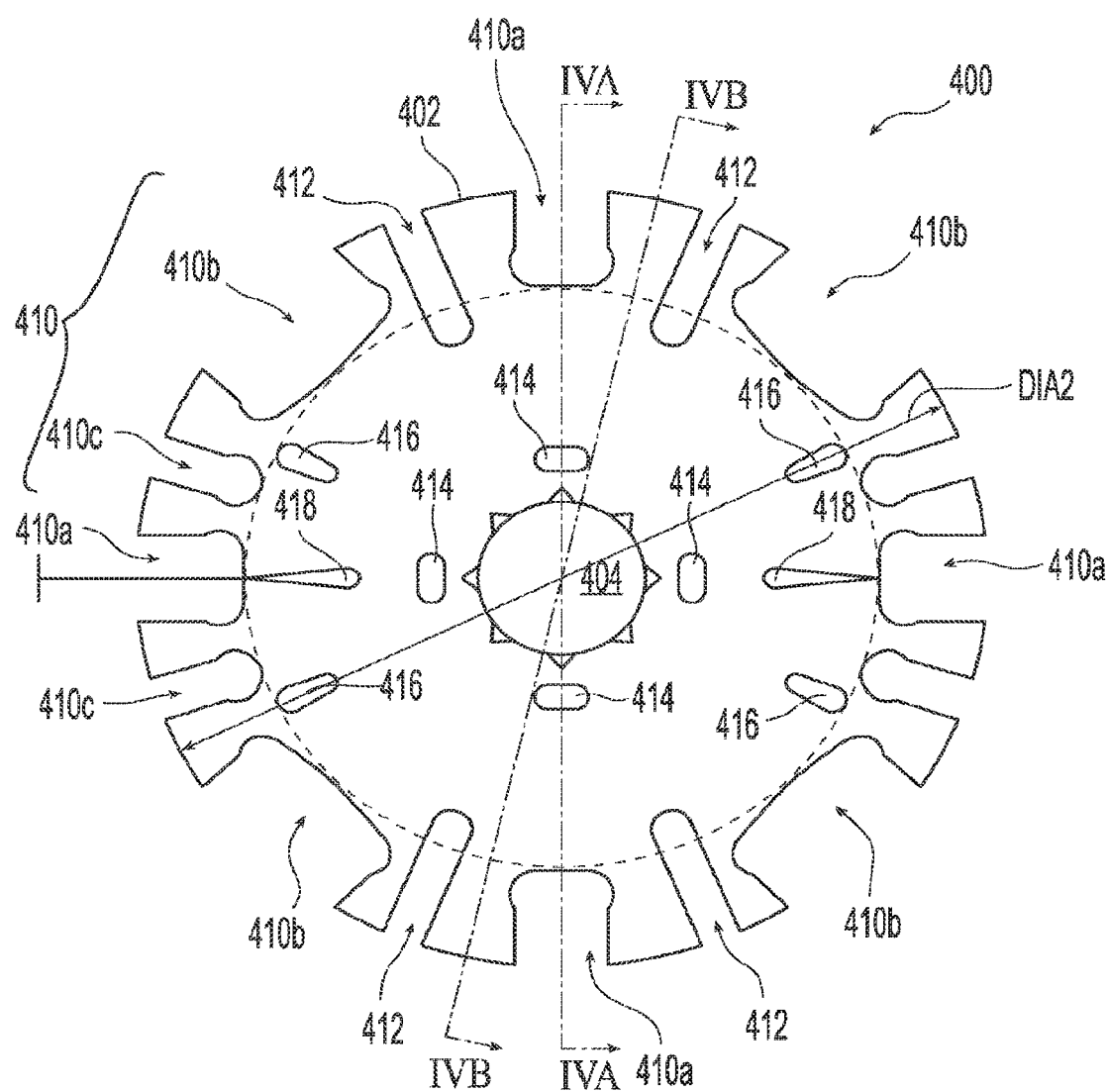
FIG. 3C is a preferred diffuser for use in the automatic nozzle of FIGS. 3A-3B.

As seen in FIG. 3C, is the preferred diffuser 400 of the preferred nozzle 302. In plan, the diffuser 400 defines a substantially. circular shape with an outer peripheral edge 402 formed about a central diffuser axis. The diffuser 400 includes a central bore 404 for mounting about the frame 310. The diffuser 400 is a substantially frustoconical member having an upper surface 406 and a lower surface 408 that is preferably substantially parallel to the upper surface 406. Preferably, the diffuser element 400 includes a substantially planar central base region 406a and an outer annular substantially planar region 406c in which each of the central and outer regions of the upper surface 406 are disposed orthogonal to the nozzle axis when the diffuser element 400 is installed about the frame 310. The outer planar region 406c and its peripheral edge 402 define the maximum outer diameter DIA2 of the diffuser 400 so as to preferably be 1.22 inches (31,0 mm). The diffuser element 400 is further preferably formed such that the upper surface 406 defines a generally annular intermediate region 406b between the central region 406a and the outer region 406c. The intermediate region 406b preferably defines a truncated cone slanted at a downward angle a, relative to a plane parallel the central and outer planar regions 406a, 406c. The angle a preferably ranges between about e.g. in the range of about 15° to about 60° and is more preferably about 18°.

The surfaces of the diffuser 400 further define a plurality of slots and through holes through which fluid flows to form the water mist pattern of the nozzle 302. Preferred embodiments of the nozzle 302, its diffuser 400 and water mist pattern are shown and described in U.S. Patent Publication No. 2011/0315406. A commercial embodiment of the preferred nozzle 302 is shown and described in Tyco Fire Products LP technical data sheet TFP2229, entitled "Ultra Low Flow AQUAMIST Nozzles Type ULF AM29 Automatic (Closed)" (May 2015). Each of U.S. Patent Publication No. 2011/0315406 and TFP2229 is incorporated by reference in its entirety.

In the preferred diffuser element 400, the plurality of slots preferably includes at least three groups of slots 410, 412 and 418. Generally, each of the slots has an initial portion, a terminal portion and an intermediate portion that is continuous and disposed between the initial and terminal portions. The initial portion of the slot is defined by an opening along the peripheral edge 402 of the diffuser element 400. The opening forms a pair of spaced apart walls in the diffuser 400 that extend inward toward the diffuser central axis so as to define the intermediate portion of the slot. In each of the slots of the diffuser element 400, the pair of walls converge to form the end face of the slot and define the terminal end portion of the slot. The spacing between the walls define the width of the slot. The spacing between the walls of the slot can be constant along the length of the slot or alternatively the spacing between the walls may vary. Moreover, the wall spacing of the slot can vary either continuously along the slot length or vary discretely such that one portion of the slot varies from another portion of the slot, for example, the terminal portion may be wider than the initial or intermediate portion of the slot.

In the preferred embodiment of the diffuser element 400, the groups of slots 410, 412, 418 vary with respect to one or more of the slot features such as, for example, slot width, slot length, and/or geometry of any one of the initial, intermediate or terminal portions of the slot. The first group of slots 410 in which the opening and wall of the slot are dimensioned to define a preferred constant width along the length of the slot between the initial and intermediate portions of the slot. The terminal portion of the slot defines a slot width greater than the slot width of the initial or intermediate portions of the slot. Within the first group of slots 410, the preferred embodiment of the diffuser element 400 includes at least three types of slots 410a, 410b, 410c which vary with respect to one or more of the slot features such as, for example, slot width and/or geometry of any one of the initial, intermediate or terminal portions of the slot. For example, the slot widths the initial and intermediate portions vary from slot type to slot type.

In the second group of slots 412, the slot opening and walls are preferably spaced to define a slot width that is substantially constant along the slot length from the initial portion through the intermediate portion of the slot. The terminal portion and end face of the slot is preferably defined by a radius of curvature whose center is centrally disposed between, the two walls of the slot so as to be located along the central axis of the slot. The terminal portion of the slots 412 is preferably located such that the slot length of the second group of slots 412 is greater than the slot length of the first group of slots 410.

The preferred third group of slots 418 has its opening along a peripheral edge 402 and preferably located along the end face of the terminal portion of a slot in the first group of slots 410. The walls defining the slot width in the third group preferably diverge away from one another in the inward direction such that the slot width broadens at preferably constant rate from the initial portion through the intermediate portion in the inward direction. The terminal portion and end face of the slot is preferably located more radially inward than the terminal portions of either the first group 410 or second group 412 of slots. The formation of the diffuser 400 can bring the walls at the initial portion of the slots of the third group of slots 418 into close contact such that the third group of slots 418 act as through holes forming a substantially tear dropped shaped opening in the diffuser element that is completely bound by an effectively continuous wall.

Each group of slots and through holes is preferably symmetrically and equiradially disposed over the diffuser element 400. More specifically, the first type of slots 410*a* preferably include two pairs of diametrically opposed slots; the second type of slots 410*b* of the first group 410 preferably includes two pairs of diametrically opposed slots disposed slots; each pair disposed on a pair of orthogonal axes preferably located forty-five degrees (45°) relative to the first type of slots 410*a*. The third type of slots 410*c* of the first group 410 preferably includes two pairs of diametrically opposed slots; each pair disposed respectively at an angle of about eighteen degrees (18°) relative to one of the first type of slots 410*a*. The second group of slots 412 preferably includes two pairs of diametrically opposed slots located at an angle of about eighteen degrees relative to the first type of slot such that radially adjacent slots of the third type 410*c* of the first group 410 and the slots of the second group 412 are radially spaced by about fifty degrees (50°). The third group of slots 418 preferably includes pair of diametrically opposed slots preferably axially aligned with one pair of diametrically opposed slots of the first type 410*a* of the first group 410. More preferably, the slots of the third group 418 are centered between slots of the third type 410*c* of the first group 410.

The diffuser 400 also preferably includes a plurality of through holes. More preferably, the diffuser element 400 includes a plurality of groups of through holes 414, 416 with a geometry that preferably varies group to group. For example, the first group of through holes 414 is preferably substantially elliptical in shape and the second group of through holes 416 is substantially key-holed shaped. The second group of through holes 416 are also preferably elongated so as to have a major axis and a minor axis orthogonal to the major axis. The major axis preferably intersects the central axis of the diffuser 400. The second group of through holes 416 are each defined by a first radius and a second radius each having a center disposed along the major axis of the through hole 416. The second radius is preferably smaller than the first radius so that the through hole 416 is substantially key holed shape, tapering narrowly in the inward direction.

The first through holes 414 preferably includes two pairs of diametrically opposed through holes in which each through hole has its minor axis aligned with the orthogonal central axes of the first type of slots 410*a* of the first group 410. The second group of through holes 416 preferably include two pairs of diametrically opposed through holes in which their major axes are disposed on intersecting axes. More preferably, the second through holes are oriented such their major axes are disposed at a radial angle of about twenty-six degrees to the central axes of the first type of slots 410*d* of the first group 410.

Referring back to FIG. 1F and FIG. 1G, an alternate installation is provided for localized application of water mist in the protection of the below-the-floor cable tray 17 and the cable housed therein. The preferred plurality of nozzles 302 of FIGS. 3A-3C are installed in a pendent configuration with a nozzle-to-nozzle spacing ranging from a minimum 6 ft.×6ft. (1,8 m—1,8 m) to a maximum 8 ft.—8 ft. (2,6 m×2,6 m). The preferred nozzles 302 define a preferred working nozzle pressure of 11.0 to 250 psi. (7,6 to 17,2 bar). The preferred localized application configuration is preferably hydraulically configured to a minimum four nozzles per design area. The diffuser 400 is disposed at a diffuser-to-floor distance of no more than a maximum of 7.75 in. (19,7 cm.) and spaced no more than 12 in. (30,6 cm.) from an elongated edge of 17*a* of at least one below-the-floor cable tray such that the nozzle 302 is preferably not directly above the at least one below-the-floor cable tray.

The preferred method and systems of water mist fire protection preferably includes water mist generation from above the floor 14. In one particular preferred embodiment, a plurality of nozzles 302, as seen in FIGS. 3A-3C, are installed above the floor 14 and beneath the ceiling 16 in a pendent configuration as schematically shown in FIG. 1A. In a preferred installation, the nozzles 302 are located and installed to define a nozzle-to-nozzle spacing ranging from a minimum 6 ft.×6ft. (1,8 m×1,8 m) to 12 ft.×12 ft. (3,7 m×3,7 m), each of the pendent nozzles having a diffuser defining a diffuser-to-ceiling distance of 1.75 in. to 4 in. (45 mm to 102 mm). With the preferred nozzles 302 define a preferred working nozzle pressure of 110 to 250 psi. (7,6 to 17,2 bar); the preferred above-the-floor configuration, the nozzles 302 are preferably connected in a grid to define a hydraulic design demand of at least the most remote fourteen (14) nozzles and more preferably the most remote eighteen (18) nozzles in the system 100.

Figure 1F:
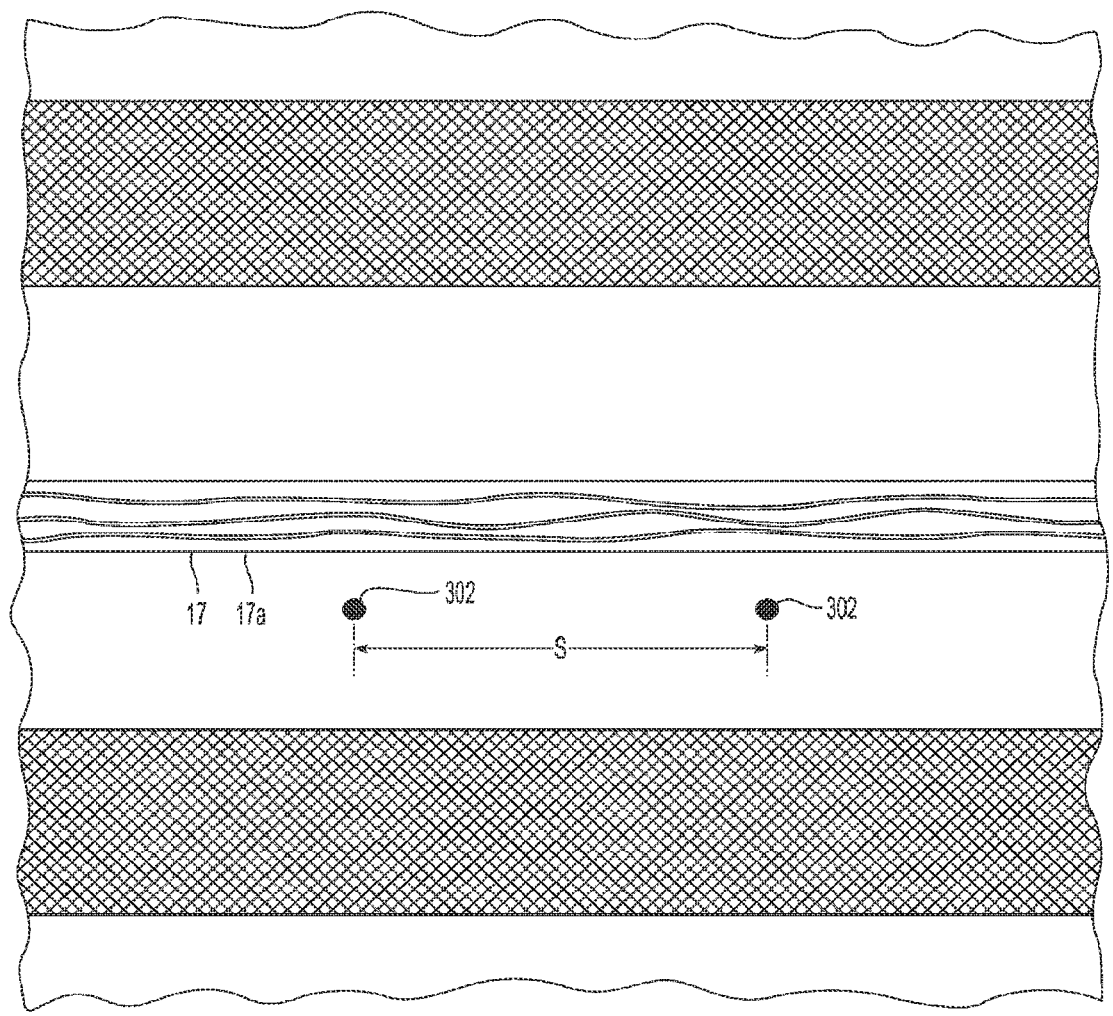
FIGS. 1F-1G are elevation and plan views of another embodiment of a the system of FIG. 1A.
Figure 1G:
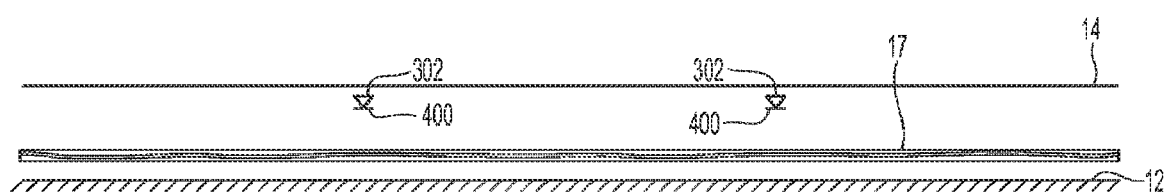

As with the below-the-floor with grating arrangements of FIGS. 1F and 1G, the nozzles 302 can be used in an above-the-floor configuration with grating for ceilings. More specifically, the nozzles 302 can be arranged and spaced below and about a ceiling grate preferably centered in the aisle between the server cabinets with walls or barriers to provide a hot air aisle containment area between the servers. With a nozzle 302 centered below the grate, protection for the containment area can be realized.

A number of embodiments of the invention have been described. Nevertheless, it will be understood that various modifications may be made without departing from the spirit and scope of the invention. Accordingly, it is intended that the present invention not be limited to the described embodiments, but that it has the full scope defined by the language of the following claims, and equivalents thereof.

What is claimed is:

1. A method of water mist fire protection, comprising:
locating a plurality of automatic water mist nozzles so that the plurality of automatic water mist nozzles are at least one of above a raised floor of a data center or below the raised floor of the data center; the plurality of automatic water mist nozzles are upright, have a nozzle-to-nozzle spacing greater than or equal to 6 feet by 6 feet and less than or equal to 12 feet by 12 feet, and have a diffuser of each automatic water mist nozzle spaced less than or equal to 3 inches from the floor, the floor disposed above a deck of the data center at no more than a maximum distance of 3.28 feet to define an interstitial space therebetween, at least one cable tray disposed between the floor and the deck at a distance of no less than 12 inches from the floor, each diffuser spaced less than or equal to 12 inches from an elongated edge of the at least one cable tray, the plurality of automatic water mist nozzles comprising a minimum of four automatic water mist nozzles per design area;
wherein locating the plurality of automatic water mist nozzles includes locating the plurality of automatic water mist nozzles below the raised floor in which each automatic water mist nozzle includes a frame body having an inlet for receipt of water, an outlet with a passageway extending between the inlet and the outlet to define a nominal K-Factor of less than 1 gpm/(psi)$^{1/2}$, a seal assembly, a thermally responsive trigger to support the seal assembly in the outlet; and
interconnecting the automatic water mist nozzles to a water supply to generate a water mist to address a fire in the at least one above or below the raised floor in the presence of at least one of: (i) a continuous flow of air through the interstitial space, (ii) fire-propagating cable in the at least one cable tray, and (iii) a fluid delivery delay from the water supply to the plurality of automatic water mist nozzles.

2. The method of claim 1, wherein the diffuser coupled to the frame body and spaced from the outlet, the diffuser being a planar member with a central portion axially aligned with the passageway and an outer peripheral portion circumscribed about the central portion to define a substantially circular periphery, the outer peripheral portion including a plurality of spaced apart tines to define a plurality of open ended slots formed between the tines and extending radially inward at an equal distance, the frame body including a pair of frame arms diametrically opposed about the outlet to support the diffuser spaced from the outlet.

3. The method of claim 1, wherein locating the plurality of automatic water mist nozzles includes locating the plurality of automatic water mist nozzles relative to at least one below-the-floor cable tray that includes the fire-propagating cable.

4. The method of claim 1, wherein locating the plurality of automatic water mist nozzles includes locating at least one automatic water mist nozzle directly beneath a floor grate region of the raised floor, the at least one automatic water mist nozzle being no further inset than a maximum 2 in. (51 mm.) from a lateral edge of the floor grate region.

5. The method of claim 1, wherein locating the plurality of automatic water mist nozzles includes spacing the plurality of automatic water mist nozzles such that each nozzle is not directly above the at least one below-the-floor cable tray.

6. The method of claim 1, wherein the plurality of automatic water mist nozzles is designed with a working pressure ranging from 110 to 250 psi.

7. The method of claim 1, wherein locating the plurality of nozzles includes installing a group of nozzles to provide for localized application and protection of at least one below-the-floor cable tray, the group of nozzles being in a pendent configuration with a nozzle-to-nozzle spacing ranging from a minimum 6 ft.×6 ft. (1.8 m×1.8 m) to 8 ft.×8 ft. (2.6 m×2.6 m) with a diffuser at a diffuser-to-floor distance of no more than a maximum of 7.75 in. (19.7 cm.) and spaced no more than 12 in. (30.6 cm.) from an elongated edge of at least one below-the-floor cable tray such that the group of nozzles is not directly above the at least one below-the-floor cable tray.

8. The method of claim 1, wherein locating the plurality of nozzles includes installing the plurality of nozzles above the floor and beneath the ceiling.

9. The method of claim 1, wherein locating the plurality of nozzles includes locating the plurality of nozzles above the floor and beneath the ceiling by installing the nozzles in a pendent configuration, each diffuser defining a diffuser-to-ceiling distance of 1.75 in. to 4 in. (45 mm to 102 mm).

10. The method of claim 1, comprising:
locating at least one automatic water mist nozzle beneath a ceiling grate.

11. The method of claim 1, comprising:
interconnecting the plurality of automatic water mist nozzles to the water supply by interconnecting a fluid control valve between the water supply and the plurality of automatic water mist nozzles.

12. The method of claim 11, comprising:
interconnecting the fluid control valve by providing for a dry network of pipes interconnecting the plurality of nozzles to the fluid control valve.

13. The method of claim 11, comprising:
interconnecting the fluid control valve by providing for a dry network of pipes that defines a fluid delivery delay time of no more than 30 seconds.

14. The method of claim 1, comprising:
interconnecting a fluid control valve with a detector for detecting a fire to operate the fluid control valve before actuation of any one of the plurality of automatic water mist nozzles.

15. The method of claim 1, comprising:
at least one diffuser is a planar member with a central portion axially aligned with the passageway and an outer peripheral portion circumscribed about the central portion to define a substantially circular periphery, the peripheral portion including a plurality of spaced apart tines to define a plurality of open ended slots formed therebetween extending radially inward at an equal distance, and wherein the frame body includes a pair of frame arms diametrically opposed about the outlet to support the diffuser spaced from the outlet.

16. The method of claim 1, comprising:
providing the continuous flow of air using a ventilation system while addressing the fire.

17. The method of claim 1, comprising:
each diffuser disperses the water mist to address the fire.

18. The method of claim 1, comprising:
operating the plurality of automatic water mist nozzles as a wet pipe system.

19. The method of claim 1, comprising:
detecting the fire using one or more fire detectors.

* * * * *